US012673717B2

(12) United States Patent
Duford et al.

(10) Patent No.: US 12,673,717 B2
(45) Date of Patent: Jul. 7, 2026

(54) VEHICLE HAVING A STEERING ASSEMBLY

(71) Applicant: BOMBARDIER RECREATIONAL PRODUCTS INC., Valcourt (CA)

(72) Inventors: Jeremie Duford, Sherbrooke (CA); Anthony Ramiere, Shefford (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 440 days.

(21) Appl. No.: 18/494,334

(22) Filed: Oct. 25, 2023

(65) Prior Publication Data

US 2024/0140518 A1 May 2, 2024

Related U.S. Application Data

(60) Provisional application No. 63/420,991, filed on Oct. 31, 2022.

(51) Int. Cl.
B62D 1/184 (2006.01)
B60K 37/00 (2024.01)
(Continued)

(52) U.S. Cl.
CPC .............. B62D 1/184 (2013.01); B60K 37/00 (2013.01); B62D 1/187 (2013.01); B60R 21/13 (2013.01)

(58) Field of Classification Search
CPC .......... B62D 1/16; B62D 1/184; B62D 1/187; B62D 1/189; B60K 37/00; B60R 21/13; F16D 3/64
(Continued)

(56) References Cited

U.S. PATENT DOCUMENTS 3,170,711 A * 2/1965 Dunifon ................. B62D 1/184
280/775
5,722,299 A * 3/1998 Yamamoto ............. B62D 1/184
280/775
(Continued)

FOREIGN PATENT DOCUMENTS

CN 113071556 A * 7/2021 ............. B60K 37/00
EP 0050999 A1 * 5/1982 ............. B62D 1/184
KR 20160053159 A * 5/2016 ............. B62D 1/187

OTHER PUBLICATIONS

Ponthieu, CN-113071556-A, Machine Translation of Specification (Year: 2021).*
(Continued)

*Primary Examiner* — Paul N Dickson
*Assistant Examiner* — Matthew Joseph Ganci
(74) *Attorney, Agent, or Firm* — BCF LLP

(57) ABSTRACT

A vehicle including a frame; ground-engaging members; a motor; a steering assembly including a steering column; and a steering wheel assembly pivotably connected to the frame. The steering wheel assembly is arranged to pivot about a lateral pivot axis between different position, the steering wheel assembly including a steering wheel operatively connected to the steering column, and a steering support body pivotably connected to the frame, the steering wheel being rotationally connected to the steering support body. Double bonded bushings connect the steering support body to the frame, a first portion of the double bonded bushings being arranged to pivot about the lateral pivot axis relative to a second portion thereof, the double bonded bushings biasing the steering wheel assembly toward the first position; and a locking assembly for selectively locking the steering wheel assembly in position.

20 Claims, 13 Drawing Sheets

(51) Int. Cl.
  *B60R 21/13*       (2006.01)
  *B62D 1/187*       (2006.01)

(58) Field of Classification Search
  USPC .......................................................... 403/225
  See application file for complete search history.

(56)                 References Cited

U.S. PATENT DOCUMENTS

| | | | |
|---|---|---|---|
| 2016/0236703 A1* | 8/2016 | Kuwabara | B62D 1/187 |
| 2018/0029632 A1* | 2/2018 | Bodtker | B62D 5/001 |

OTHER PUBLICATIONS

Baek, KR-20160053159-A, Machine Translation of Specification (Year: 2016).*
Fourrey, EP-0050999-A1, Machine Translation of Specification (Year: 1982).*

\* cited by examiner

VEHICLE HAVING A STEERING ASSEMBLY

CROSS-REFERENCE

The present application claims priority to U.S. Provisional Patent Application No. 63/420,991, entitled "Vehicle Having a Steering Assembly," filed Oct. 31, 2022, the entirety of which is incorporated by reference herein.

FIELD OF TECHNOLOGY

The present technology relates to vehicles having a steering assembly.

BACKGROUND

Some vehicles, including off-road vehicles (e.g., side-by-side vehicles (SSVs)), have steering wheel arrangements that permit adjustment of the steering wheel. For example, some steering wheels are pivotable generally upward and downward to accommodate different driver sizes or preferences. Such arrangements generally have some locking mechanism to maintain the selected position of the steering wheel.

With the locking mechanism in an unlocked position, the steering wheel often pivots downward, under the force of gravity, to a lowest position. When unlocking the position of the steering wheel, the steering wheel then often must be held by the driver to prevent the steering wheel from falling to its lowest position.

There is thus a desire for a vehicle having a steering wheel arrangement that addresses at least in part some of these drawbacks.

SUMMARY

It is an object of the present technology to ameliorate at least some of the inconveniences present in the prior art.

According to aspects of the present technology, there is provided a vehicle with a steering assembly having a steering wheel assembly that is pivotable with respect to the frame/remaining portions of the vehicle. The steering wheel assembly is connected to the frame via two double-bonded bushings which bias the steering wheel assembly toward a default or base position.

According to one aspect of the present technology, there is provided a vehicle including a frame; a plurality of ground-engaging members operatively connected to the frame; a motor supported by the frame for driving the vehicle; a steering assembly for steering the vehicle, the steering assembly including a steering column operatively connected to at least one ground-engaging member of the plurality of ground-engaging members; and a steering wheel assembly pivotably connected to the frame, the steering wheel assembly being arranged to pivot about a lateral pivot axis between at least a first position and a second position, the steering wheel assembly including a steering wheel operatively connected to the steering column, and a steering support body pivotably connected to the frame, the steering wheel being rotationally connected to the steering support body; at least one double bonded bushing connecting the steering support body to the frame, a first portion of the at least one double bonded bushing being arranged to pivot about the lateral pivot axis relative to a second portion of the at least one double bonded bushing, the at least one double bonded bushing biasing the steering wheel assembly toward the first position; and a locking assembly connected between the steering wheel assembly and the frame, the locking assembly being configured to selectively lock the steering wheel assembly in at least one of the first position and the second position.

In some embodiments, the steering wheel assembly is further pivotable to a plurality of intermediate positions between the first position and the second position; and the locking assembly is further configured to selectively lock the steering wheel in any one of the first position, the second position and any one of the plurality of intermediate positions.

In some embodiments, the steering wheel assembly is further pivotable to at least a third position; the first position is intermediate to the second position and the third position; and the locking assembly is further configured to selectively lock the steering wheel in any one of the first position, the second position and the third position.

In some embodiments, the frame includes a dashboard frame portion; and the steering support body is pivotably connected to the dashboard frame portion.

In some embodiments, the at least one double bonded bushing includes an inner sheave connected to the dashboard frame portion, the inner sheave being rotationally fixed relative to the dashboard frame portion; an outer sheave connected to the steering support body, the outer sheave being rotationally fixed relative to the steering support body; and a resilient member connected between the inner sheave and the outer sheave, the outer sheave being pivotable relative to the inner sheave through the resilient member biasing the steering support body, via the outer sheave, toward the first position.

In some embodiments, outer ends of the inner sheave abut a frame bracket formed by the dashboard frame portion; and an exterior surface of the outer sheave is press fit into a cylindrical portion formed by the steering support body.

In some embodiments, the dashboard frame portion forms at least part of a dashboard of the vehicle.

In some embodiments, the vehicle further includes a universal joint operatively connected to the steering wheel; and the lateral pivot axis passes through the universal joint.

In some embodiments, the at least one double bonded bushing includes: a first double bonded bushing, and a second double bonded bushing; and the lateral pivot axis extends through a center of the first double bonded bushing and a center of the second double bonded bushing.

In some embodiments, the first double bonded bushing is disposed on a first side of the steering column; and the second double bonded bushing is disposed on a second side of the steering column.

In some embodiments, the at least one double bonded bushing includes: a first double bonded bushing, and a second double bonded bushing; and the lateral pivot axis extends through a center of the first double bonded bushing and a center of the second double bonded bushing.

In some embodiments, the first double bonded bushing is disposed on a first side of the steering column; and the second double bonded bushing is disposed on a second side of the steering column.

In some embodiments, the locking assembly includes a plurality of plates, for each plate of the plurality of plates: a first end portion being pivotably connected to the frame, and a second end portion being pivotably connected to the steering support body, a cam rotatively connected to the second end portion of the plurality of plates; and a lever connected to the cam. The lever and the cam are selectively rotatable between a locked position and an unlocked position, in the locked position, the cam compresses the plurality of plates for impeding movement of the steering support body relative to the frame to selectively lock the steering wheel in one of the first position and the second position, and in the unlocked position, the plurality of plates are permitted to pivot allowing for movement of the steering support body relative to the frame to permit the steering wheel to be moved between the first position and the second position.

In some embodiments, for each plate of the plurality of plates, a slot is defined in the second end portion; the locking assembly further includes a fastener extending through the slot; and the fastener connects together the lever, the cam, and the plurality of plates.

In some embodiments, the locking assembly further includes a telescoping plate for selectively adjusting a distance between the steering wheel and the frame; a first end portion of the telescoping plate is pivotably connected to the steering support body; a second end portion of the telescoping plate is operatively connected to the cam; and when in the unlocked position, the telescoping plate is selectively translatable; and when in the locked position, the cam impedes movement of the telescoping plate.

In some embodiments, the vehicle further includes a driver display connected to the steering support body; and the driver display pivots and translates with the steering wheel.

In some embodiments, the frame includes a dashboard frame portion; the steering support body is pivotably connected to the dashboard frame portion; the steering assembly is a power steering system; and the steering assembly includes a steering motor mounted to the dashboard frame portion.

In some embodiments, the plurality of ground-engaging members includes front ground-engaging members and rear ground-engaging members; and the at least one ground engaging member connected to the steering assembly is the front ground-engaging members.

In some embodiments, the vehicle further includes a roll cage connected to the frame, the roll cage and the frame forming a cockpit area; and at least one seat in the cockpit area.

In some embodiments, the vehicle is a side-by-side vehicle (SSV).

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application.

Embodiments of the present technology each have at least one of the above-mentioned objects and/or aspects, but do not necessarily have all of them. It should be understood that some aspects of the present technology that have resulted from attempting to attain the above-mentioned object may not satisfy these objects and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures are not necessarily drawn to scale.

DETAILED DESCRIPTION

The present technology will be described with respect to a four-wheel, off-road vehicle 10 having two side-by-side seats and a steering wheel (i.e. a side-by-side vehicle (SSV)). However, it is contemplated that at least some aspects of the present technology may apply to other types of vehicles such as, but not limited to, off-road vehicles having a single bucket-type seat, off-road vehicles with more than four wheels, off-road vehicles having ground-engaging members other than wheels, and other types of vehicles.

Figure 1:
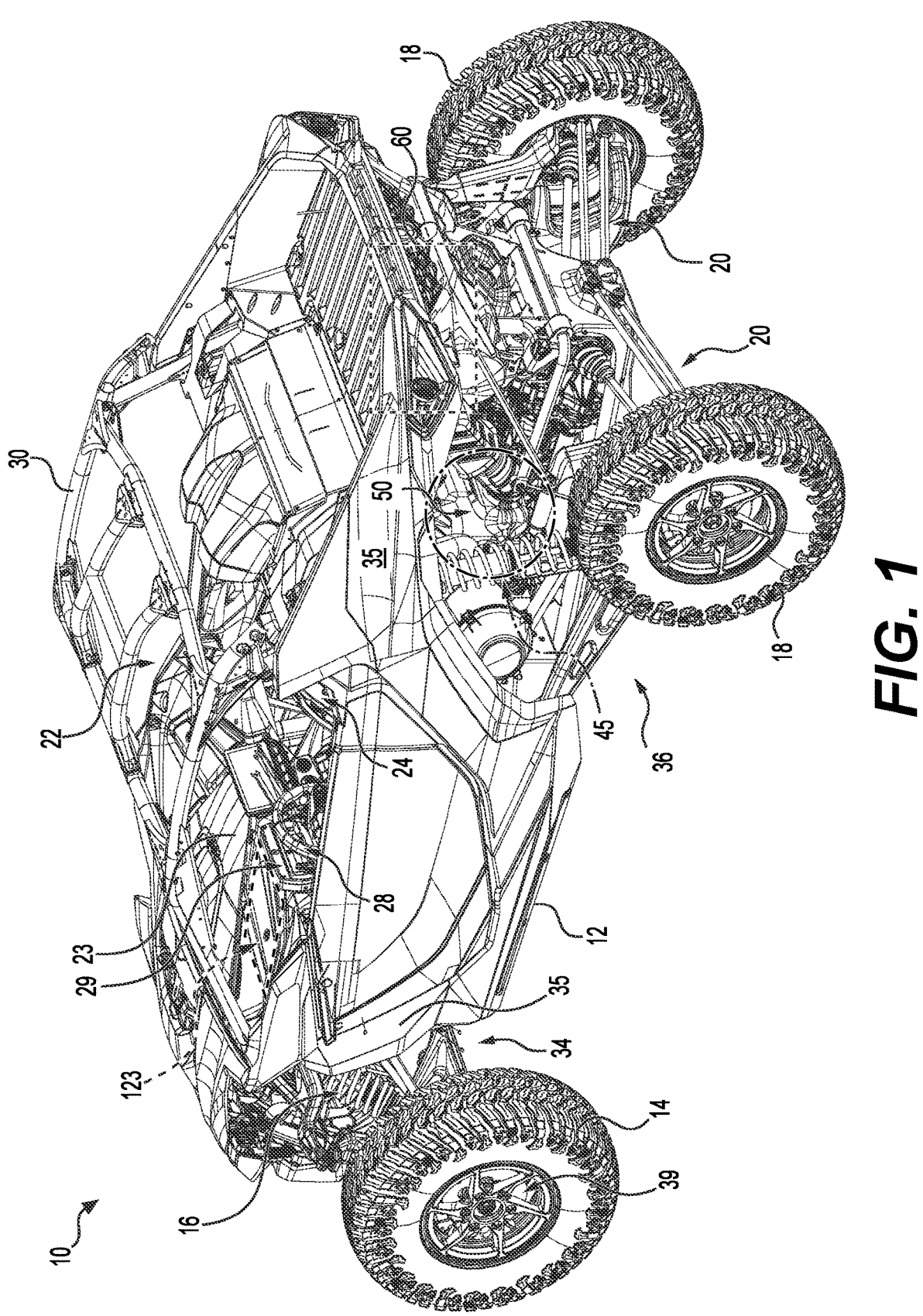
FIG. 1 is a perspective view taken from a top, rear, left side of an off-road vehicle according to an embodiment of the present technology.
Figure 2:
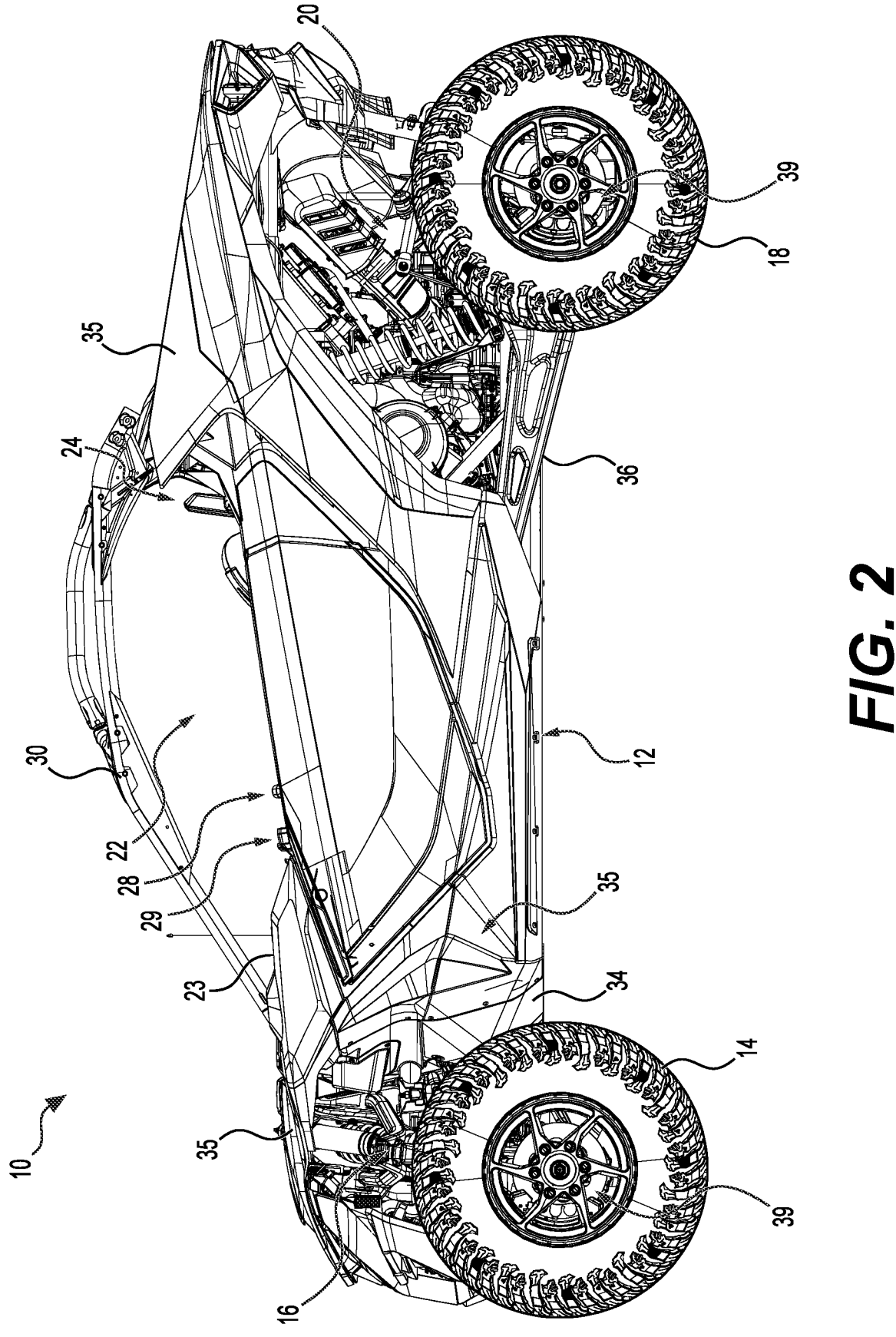
FIG. 2 is a left side elevation view of the vehicle of FIG. 1.

The general features of the off-road vehicle 10 will now be described herein with respect to FIGS. 1 and 2. The vehicle 10 has a frame 12. The frame 12 defines a central cockpit area 22 inside which are disposed a driver seat 24 and a passenger seat (not shown). In the present implementation, the driver seat 24 is disposed on the left side of the vehicle 10 and the passenger seat is disposed on the right side of the vehicle 10. However, it is contemplated that the driver seat 24 could be disposed on the right side of the vehicle 10 and that the passenger seat could be disposed on the left side of the vehicle 10. It is also contemplated that the vehicle 10 could include a single seat for the driver, or a larger number of seats, or a bench accommodating the driver and at least one passenger.

The vehicle 10 also includes a roll cage 30 connected to the frame 12 and extending at least partially over the driver seat 24 and the passenger seat. The frame 12 also has a front area 34 and a rear area 36 disposed forwardly and rearwardly of the central cockpit area 22 respectively. A plurality of body panels 35 are provided on the vehicle 10 to conceal the internal components of the vehicle 10 and to partially enclose the cockpit area 22 of the vehicle 10.

The vehicle 12 includes left and right front wheels 14 connected to the frame 12 by a pair of front suspension assemblies 16. Left and right rear wheels 18 are connected to the frame 12 by a pair of rear suspension assemblies 20. The vehicle 10 has a brake system (not separately shown) including four brake assemblies 39 (two of which are shown in FIG. 1), each one being operatively connected to a respective one of the wheels 14, 18. Each brake assembly 39 includes a brake disc and a caliper disposed around its corresponding brake disc. Each caliper is connected to a corresponding brake line. Each caliper includes a pair of brake pads positioned on opposite sides of its respective brake disc. The brake assemblies are actuated by actuating the calipers by application of a fluid pressure in the brake lines, thereby causing the brake pads to apply pressure on their respective brake discs.

The vehicle 10 has a steering system 100 operatively connected to the front wheels 14 for controlling a steering angle of the front wheels 14. The steering system 100 includes a steering wheel 28 disposed in the cockpit area 22 for a driver of the vehicle 10 to operate from the driver seat 24. The vehicle 10 also includes a driver display 29 disposed forward of the steering wheel 28. The steering wheel 28 and the driver display are disposed in front of the driver seat 24. The steering assembly 100 is described in further detail below. The vehicle 10 also includes a dashboard 23 disposed forward of the driver seat 24 and the passenger seat.

The vehicle 10 includes a powertrain 45 (shown schematically) for driving the wheels 14, 18. The powertrain 45 includes a motor 50 (partially shown in FIG. 1) that is connected to the frame 12 in a rear portion of the vehicle 10. In this embodiment, the motor 50 is an internal combustion engine, but it is contemplated that an electric motor or hybrid system could be used in non-limiting embodiments. The engine 50 is connected to a continuously variable transmission (CVT) 60 (shown schematically in FIG. 1) disposed on a right side of the engine 50.

It is contemplated that the vehicle 10 could include a variety of additional and/or different features excluded from discussion here, including but not limited to: air intake systems, exhaust systems, motor control systems, safety systems, a windscreen, radio and/or navigational systems, and luggage rack systems.

Figure 3:
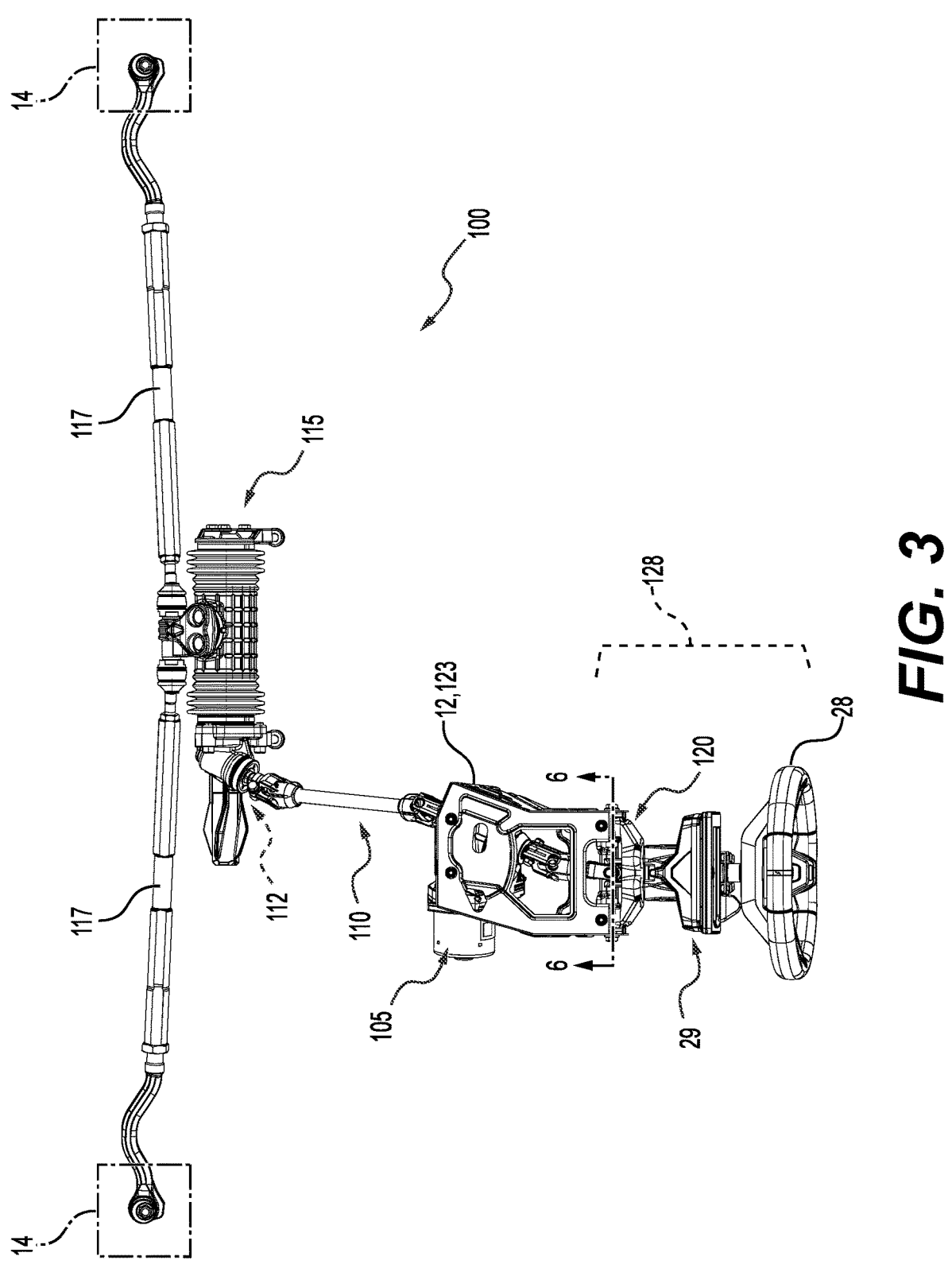
FIG. 3 is a top plan view of a steering assembly of the vehicle of FIG. 1.
Figure 4:
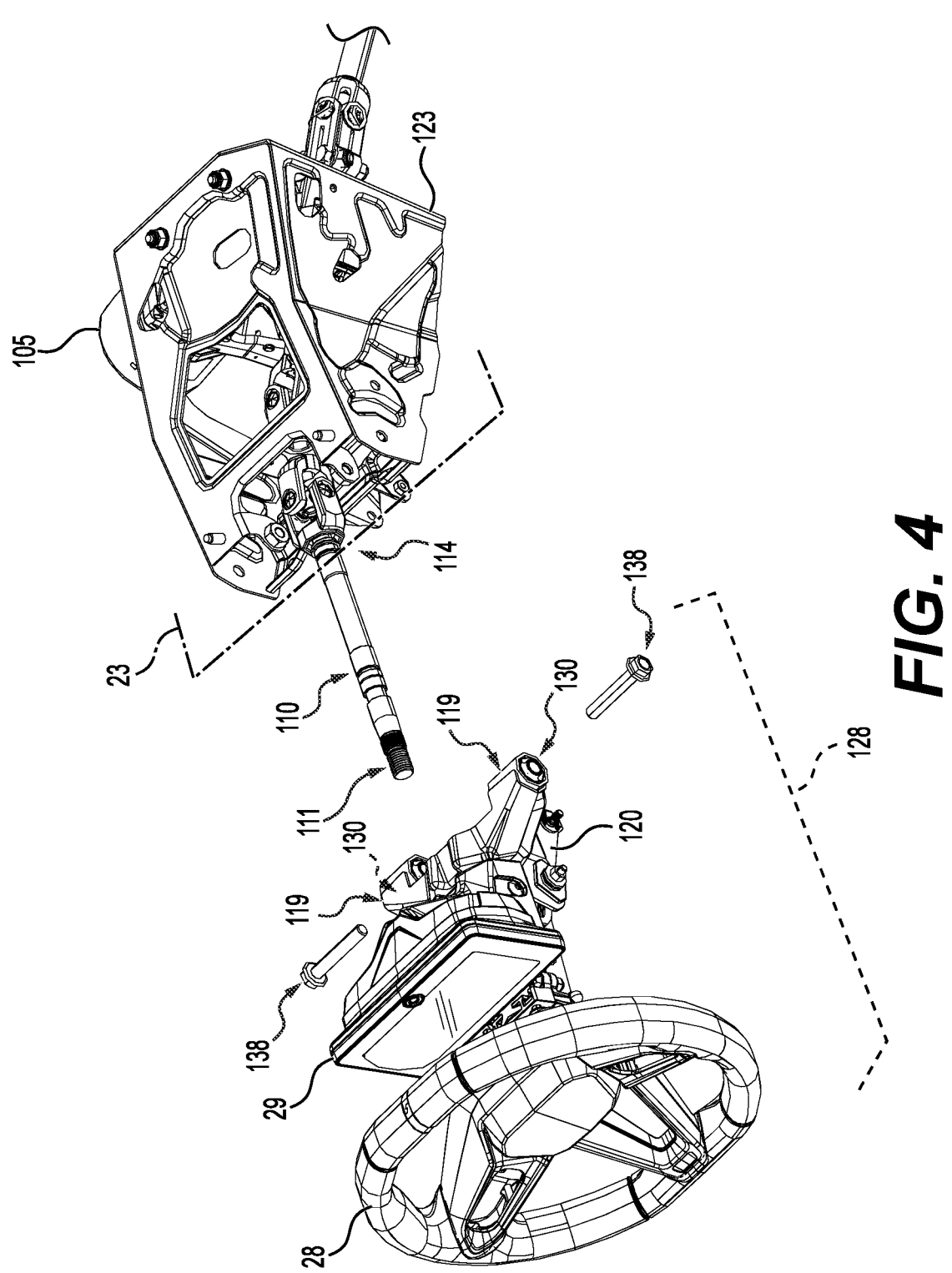
FIG. 4 is an exploded, perspective, partial view of the steering assembly of FIG. 3.

With reference to FIGS. 3 and 4, the steering assembly 100 is illustrated in more detail. The steering assembly 100 includes the steering wheel 28 disposed forward of the driver seat 24 in the central cockpit area 22 as is noted above.

The steering wheel 28 is connected to a steering column 110 of the steering assembly 100 to transmitting rotation of the steering wheel 28 to following components of the steering assembly 100. Specifically, the steering wheel 28 is connected and rotationally fixed relative to a rear end portion 111 of the steering column 110. The steering column 110 is operatively connected to the front wheels 14. More particularly, a forward end portion 112 of the steering column 110 is operatively connected to a rack and pinion assembly 115. By the present embodiment, the steering assembly 100 is specifically a power steering system 100 including a steering motor 105 mounted to the frame 12.

The steering assembly 100 further includes two steering rods 117. Each steering rod 117 is operatively connected to the rack and pinion assembly 115 by an interior end thereof. Outer ends of each steering rod 117 is operatively connected to a corresponding front wheel 14 (illustrated schematically in FIG. 3). Specifics of the rack and pinion assembly 115 and connections to the steering rods 117 could vary in different embodiments and will not be described in more detail herein.

The steering assembly 100 further includes a steering wheel assembly 128. The steering wheel assembly 128 includes the steering wheel 28 and a steering support body 120 to which the steering wheel 28 is connected. The steering wheel 28 is rotationally connected to the steering support body 120 to permit rotational motion of the steering wheel 28. As is noted above, steering wheel 28 is operatively connected to the steering column 110 to control steering of the vehicle 10. The rear end portion 111 of the steering column 110 extends through the steering support body 120 and connects to the steering wheel 28, as is illustrated in FIG. 4. In the illustrated embodiment, the driver display 29 is also connected to the steering support body 120.

The steering support body 120 is pivotably connected to the frame 12. In the present embodiment, the steering support body 120 is specifically pivotably connected to a dashboard frame portion 123 of the frame 12. The dashboard frame portion 123 forms part of the dashboard 23 of the vehicle 10, as is illustrated schematically in FIG. 1. The steering motor 105 is also mounted to the dashboard frame portion 123 in the present embodiment, although it is contemplated that the motor 105 could be supported by a different portion of the frame 12.

With additional reference to FIGS. 5 to 9, the steering wheel assembly 128 is arranged to selectively pivot about a lateral pivot axis 139 between a plurality of positions in order to provide adjustability of a position of the steering wheel 28 to the driver. As the driver display 29 is connected to the steering support body 120 in the present embodiment, the driver display 29 pivots and/or translates with the steering wheel 28.

Figure 5:
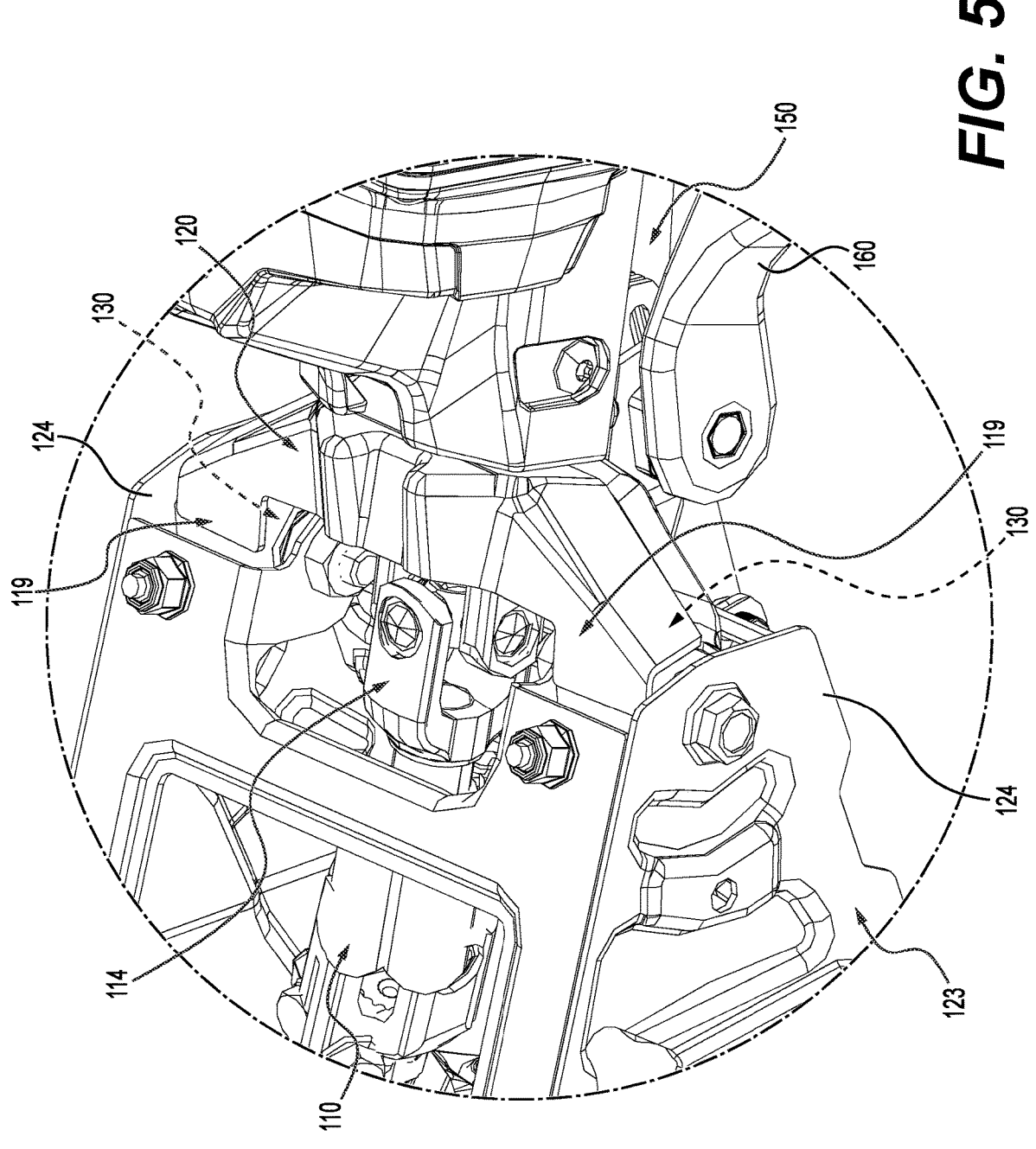
FIG. 5 is a close-up, partial, perspective view of a frame portion and a steering wheel assembly of the steering assembly of FIG. 3.

The steering column 110 includes a universal joint 114 operatively connected to the steering wheel 28 to allow for a change in angle between the steering wheel 28 and subsequent portions of the steering assembly 100. As can be seen in FIG. 5, the lateral pivot axis 139 passes through the universal joint 114. It is noted that the steering column 110 includes additional universal joints (not separately identified) but the specific arrangement of remaining portions of the steering column 110 could vary.

The steering assembly 100 further includes a locking assembly 150 for selectively locking the steering wheel assembly 128 in a desired position relative to the frame 12. The locking assembly 150 is connected between the steering wheel assembly 128 and the dashboard frame portion 123. To selectively impede movement, specifically pivoting, of the steering wheel assembly 128, the locking assembly 150 is selectively configurable between an unlocked position (allowing movement of the steering wheel assembly 128) and a locked position (impeding movement of the steering wheel assembly 128). The locked and unlocked configurations and the locking assembly 150 more generally will be described in more detail below.

Figure 7:
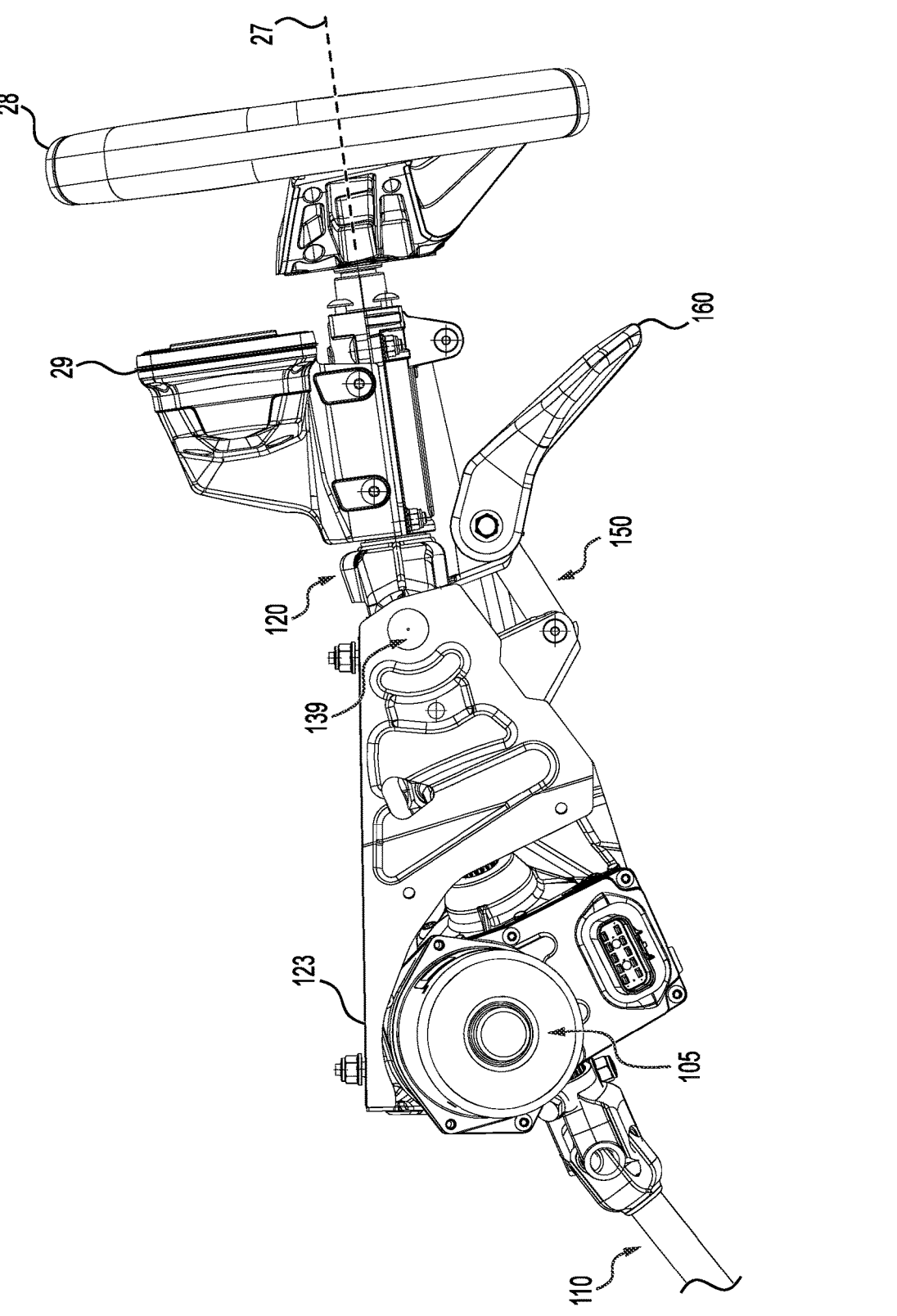
FIG. 7 is a left side elevation view of the frame portion, the steering wheel assembly, and a steering column of the steering assembly of FIG. 3, with a steering wheel of the steering wheel assembly being in a base position.
Figure 8:
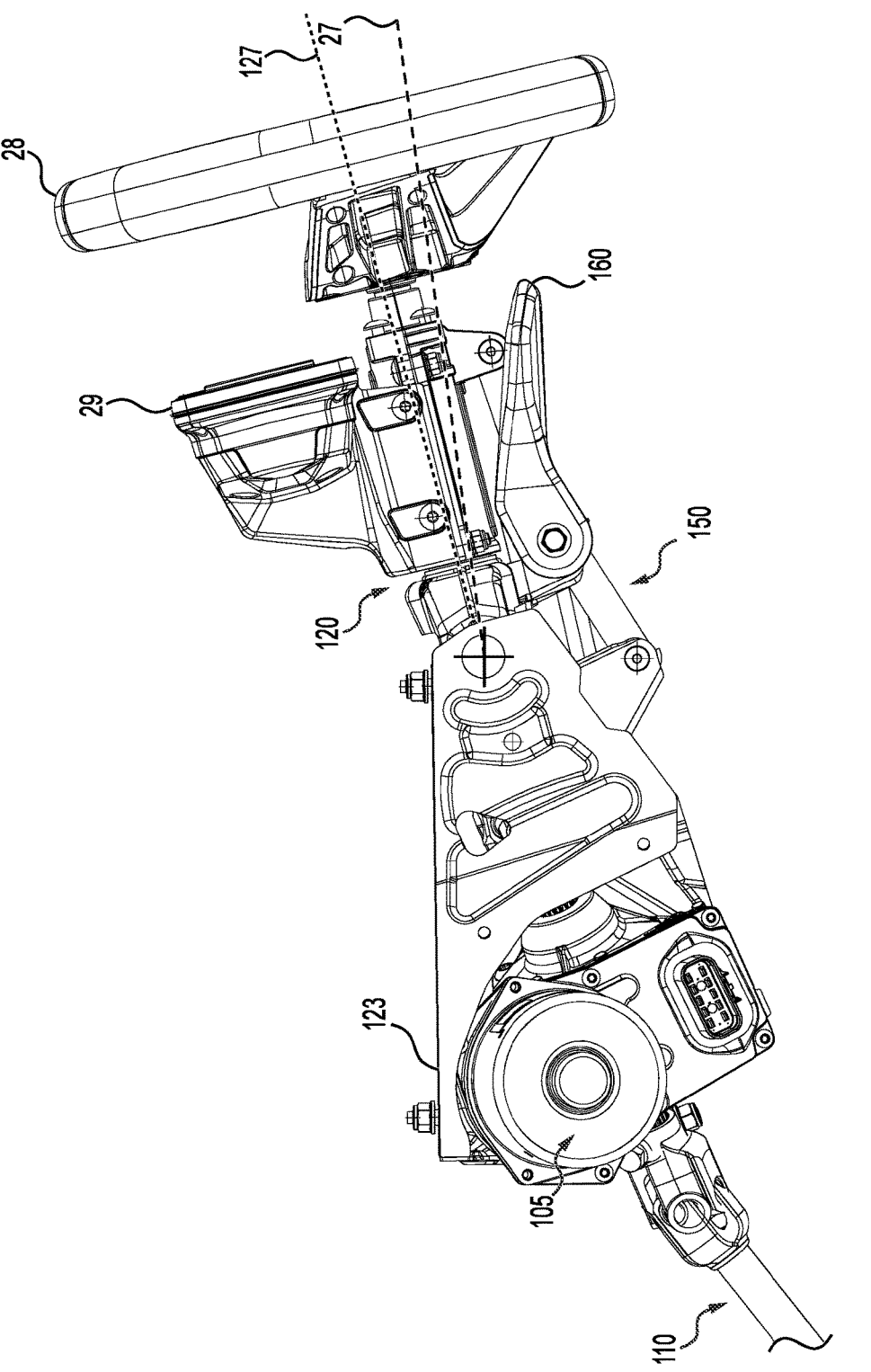
FIG. 8 is a left side elevation view of the frame portion, the steering wheel assembly, and the steering column of FIG. 7, with the steering wheel being in a raised position.
Figure 9:
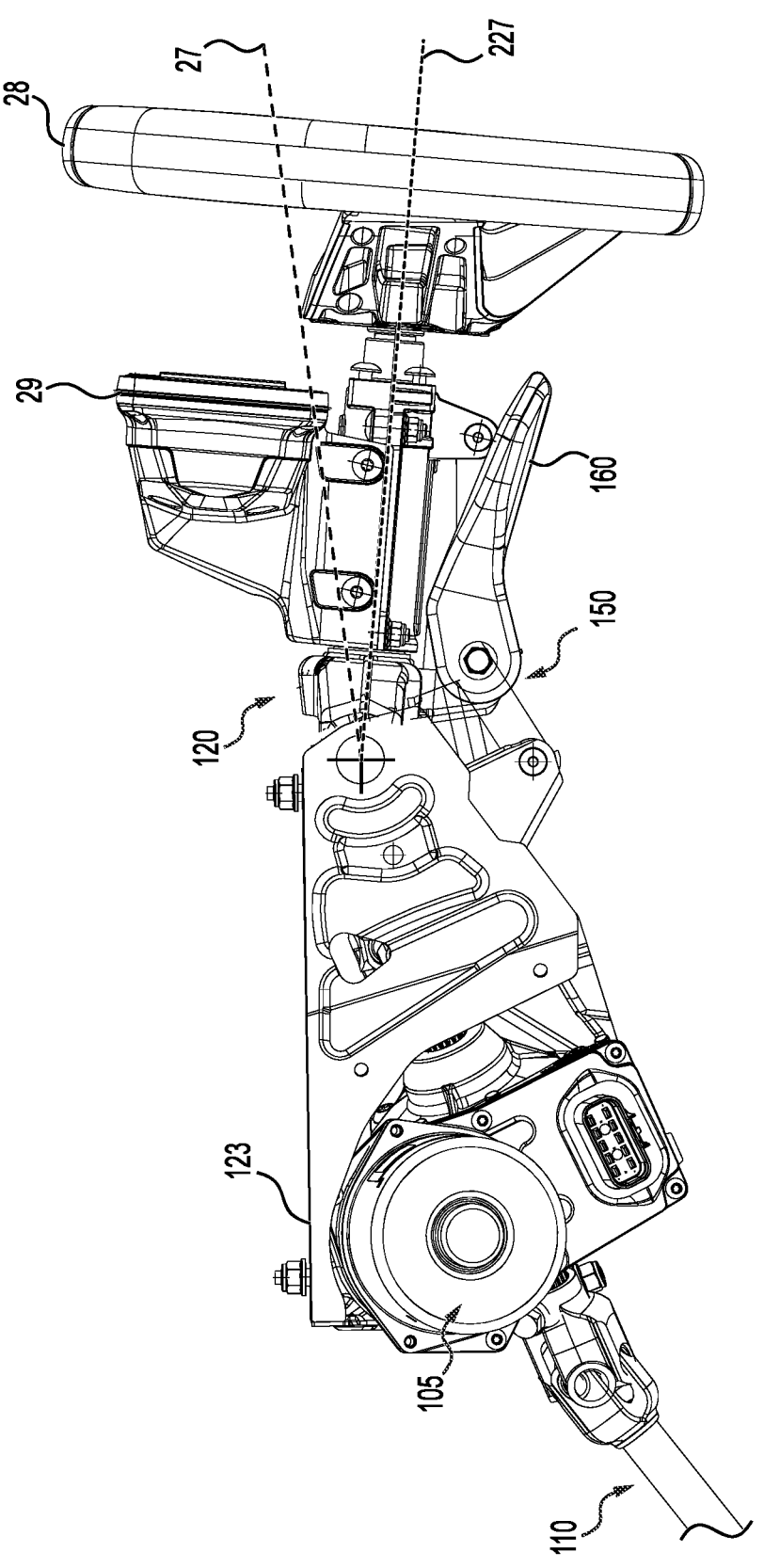
FIG. 9 is a left side elevation view of the frame portion, the steering wheel assembly, and the steering column of FIG. 7, with the steering wheel being in a lowered position.

According to the present technology, when the locking assembly 150 is in the unlocked configuration, the steering assembly 100 is configured and arranged to bias the steering wheel assembly 128 toward a first or default position. A non-limiting example of the default position is illustrated in FIG. 7; additional examples of possible positions of the steering wheel assembly 128 are illustrated in FIGS. 8 and 9.

To bias the steering wheel assembly 128 toward the default position, the steering assembly 100 further includes two double bonded bushings (DBBs) 130 connecting the steering support body 120 to the dashboard frame portion 123. It is contemplated that in some embodiments more double bonded bushings 130 could be included; in some embodiments, only one double bonded bushing 130 may be used. One DBB 130 is disposed on a left side of the steering column 110 and the other DBB 130 is disposed to a right side of the steering column 110, specifically with the universal joint 114 being disposed therebetween. The lateral pivot axis 139 extends through a center of each double bonded bushing 130. As is noted above, the lateral pivot axis 139 also extends through a pivot axis of the universal joint 114.

Figure 6:
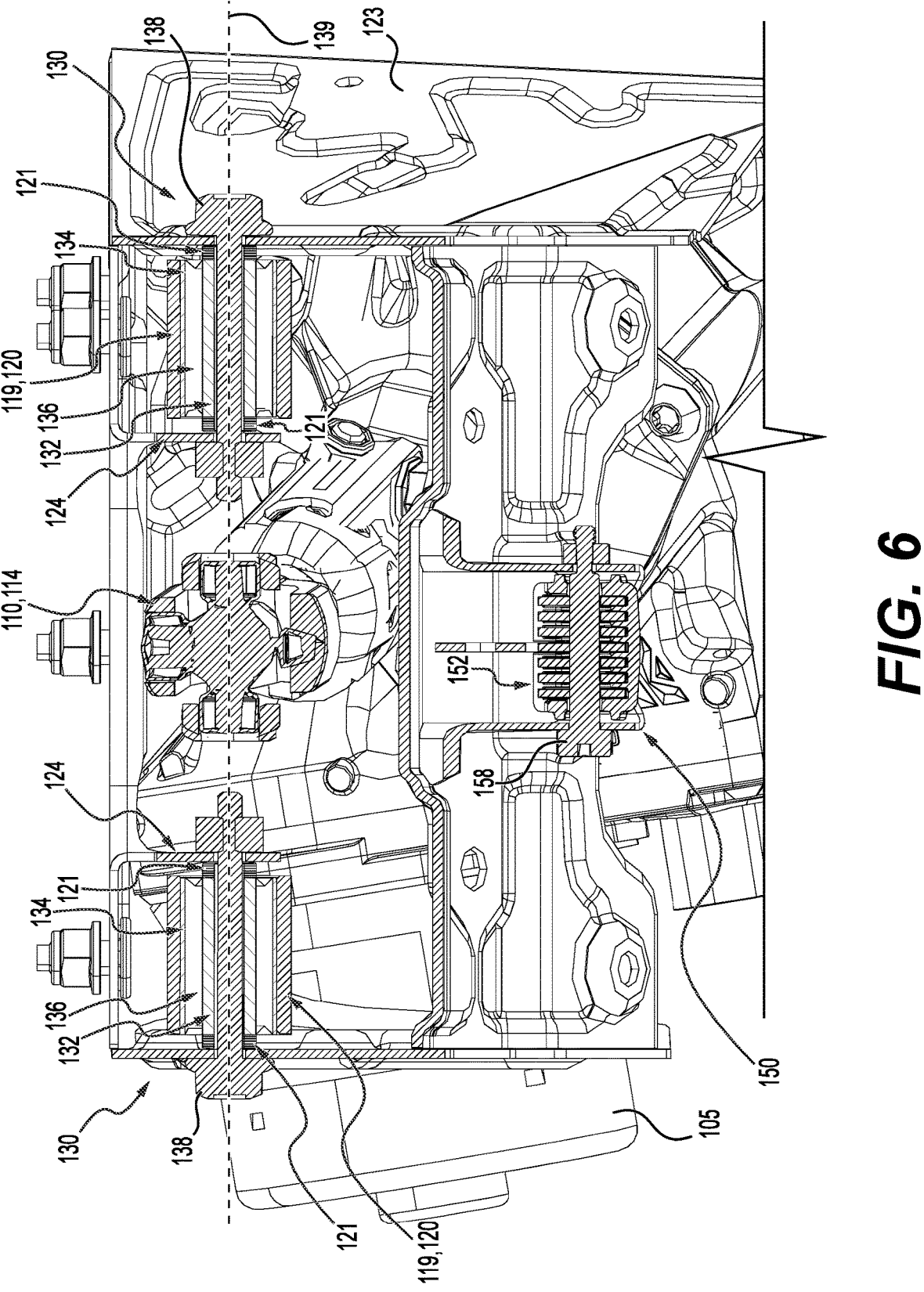
FIG. 6 is a cross-sectional view of the frame portion and the steering wheel assembly of FIG. 5, taken along line 6-6 of FIG. 3.

As is illustrated in FIG. 6, each DBB 130 includes an inner sheave 132, an outer sheave 134, and a resilient member 136 connected between the inner sheave 132 and the outer sheave 134. To provide biasing and pivoting about the axis 139, the outer sheave 134 of each double bonded bushing 130 is arranged to pivot about the lateral pivot axis 139 relative to the inner sheave 132 of each double bonded bushing 130. A fastener 138 extends through a frame bracket 124 formed by the dashboard frame portion 12 and through the DBB 130 to secure each DBB 130 between the steering support body 120 and the dashboard frame portion 123. In the illustrated embodiment, the fastener 138 is a bolt and nut, but other type of fasteners could be used.

The inner sheave 132 is connected and rotationally fixed relative to the dashboard frame portion 123. In the illustrated embodiment, outer ends of the inner sheave 132 of each DBB 130 abut the frame bracket 124. Specifically, serrated (or knurled) outer ends 121 of the inner sheave 132 abut the frame bracket 124, but it is contemplated that in some embodiments the inner sheave 132 could indirectly abut the bracket 124, for example via washers. By tightening the fastener 138, friction between the inner sheave 132 and the bracket 124 impedes movement of the inner sheave 132 relative to the frame portion 123.

The outer sheave 134 is connected and rotationally fixed relative to the steering support body 120. In the illustrated embodiment, an exterior surface of the outer sheave is press fit into a cylindrical portion 119 formed by the steering support body 120. It is contemplated that the exact form of the connection between the outer sheave 134 and the steering support body 120 could vary in different embodiment.

The resilient member 136 is connected between the inner sheave 132 and the outer sheave 134. By the present embodiment, the resilient member 136 is a rubber membrane, specifically a membrane made from natural rubber, affixed to the inner sheave 132 and the outer sheave 134, although different resilient materials and configurations are contemplated. The outer sheave 134 is pivotable relative to the inner sheave 132, through deformation of the resilient member 136. The resilient member 136 thus biases the steering support body 120, via the outer sheave 134, toward a default position of the steering support body 120 and the steering wheel assembly 128 where the resilient member 136 is not deformed.

With continued reference to FIGS. 7 to 9, three example positions to which the steering wheel assembly 128 could be pivoted are illustrated. It is contemplated that the steering wheel assembly 128, and thus the steering wheel 28, could be selectively pivoted to any number of positions intermediate to the positions illustrated.

The default position of the steering wheel assembly 128 is illustrated in FIG. 7, with the locking assembly 150 being in an unlocked configuration (described further below). In this configuration, the steering wheel 28 (and correspondingly the upper end portion 111 of the steering column 110) rotates about a rotational axis 27. As is illustrated, even with the locking assembly 150 being unlocked, the steering wheel 28 and the steering wheel assembly 128 is biased toward the default position. The steering wheel assembly 128 does not pivot downward under the force of gravity, but rather is biased toward the default position.

A raised position of the steering wheel assembly 128 is illustrated in FIG. 8, with the locking assembly 150 being in a locked position (described further below). In this position, the steering wheel 28 (and correspondingly the upper end portion 111 of the steering column 110) rotates about a rotational axis 127 relative to the frame portion 123, with the rotation axis 27 of the default position being illustrated for reference. As one non-limiting example, the illustrated raised position could be the maximum upper position to which the steering wheel assembly 128 could be pivoted. It is contemplated that the exact angle of the upper most position could vary in different embodiments. In order to maintain the steering wheel assembly 128 in the raised position, the locking assembly 150 is in the locked position. If the locking assembly 150 is moved to the unlocked position, the steering wheel assembly 128 is biased toward the default and will pivot thereto if left to rotate.

A lowered position of the steering wheel assembly 128 is illustrated in FIG. 9, with the locking assembly 150 being in the locked position. In this position, the steering wheel 28 (and correspondingly the upper end portion 111 of the steering column 110) rotates about a rotational axis 227 relative to the frame portion 123, with the rotation axis 27 of the default position being illustrated for reference. As one non-limiting example, the illustrated lowered position could be the maximum lower position to which the steering wheel assembly 128 could be pivoted. It is contemplated that the exact angle of the lower most position could vary in different embodiments. In order to maintain the steering wheel assembly 128 in the lowered position, the locking assembly 150 is in the locked position. If the locking assembly 150 is moved to the unlocked position, the steering wheel assembly 128 is biased toward the default and will pivot thereto if left to rotate.

In the present embodiment, the default position (to which the DBBs 130 bias the steering wheel assembly 128) is located intermediate the raised position and the lowered position. In at least some embodiments, it is contemplated that the default position could be the lowest possible position of the steering wheel assembly 128. It is also contemplated that the default position could be the highest possible position of the steering wheel assembly 128.

Figure 10:
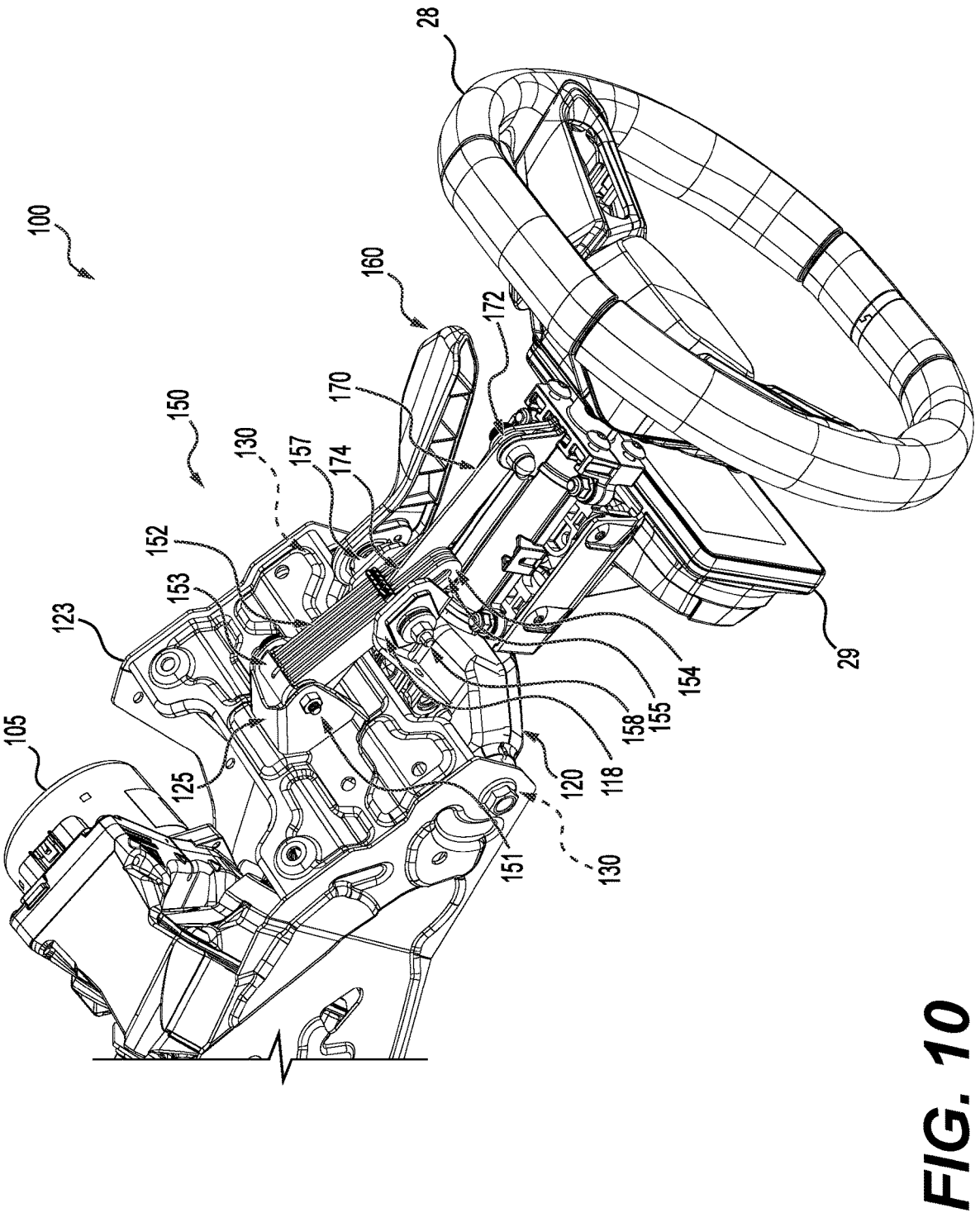
FIG. 10 is a bottom, rear, right perspective view of the frame portion and the steering wheel assembly of FIG. 5.
Figure 11:
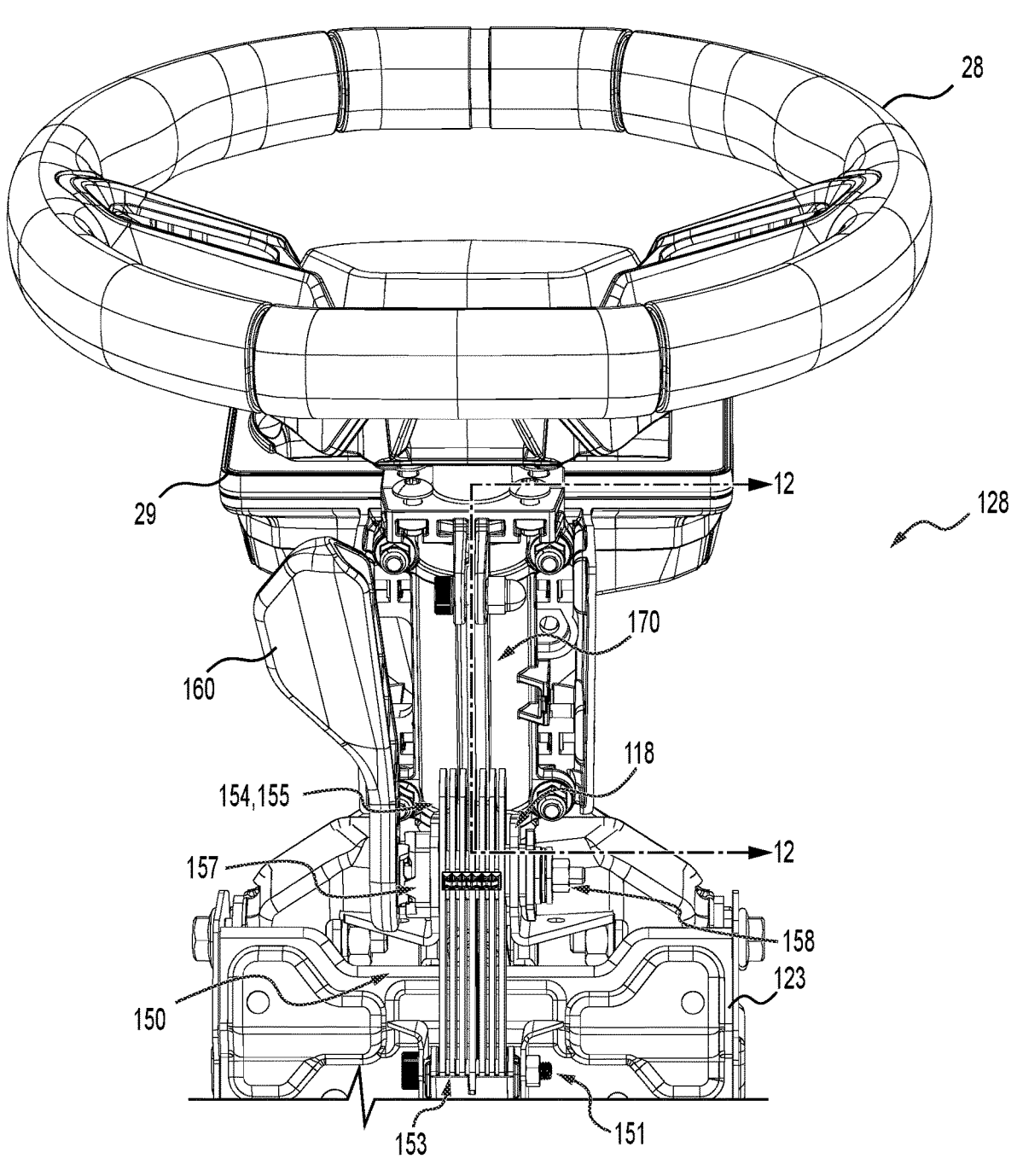
FIG. 11 is a bottom, rear perspective view of the frame portion and the steering wheel assembly of FIG. 5.
Figure 12:
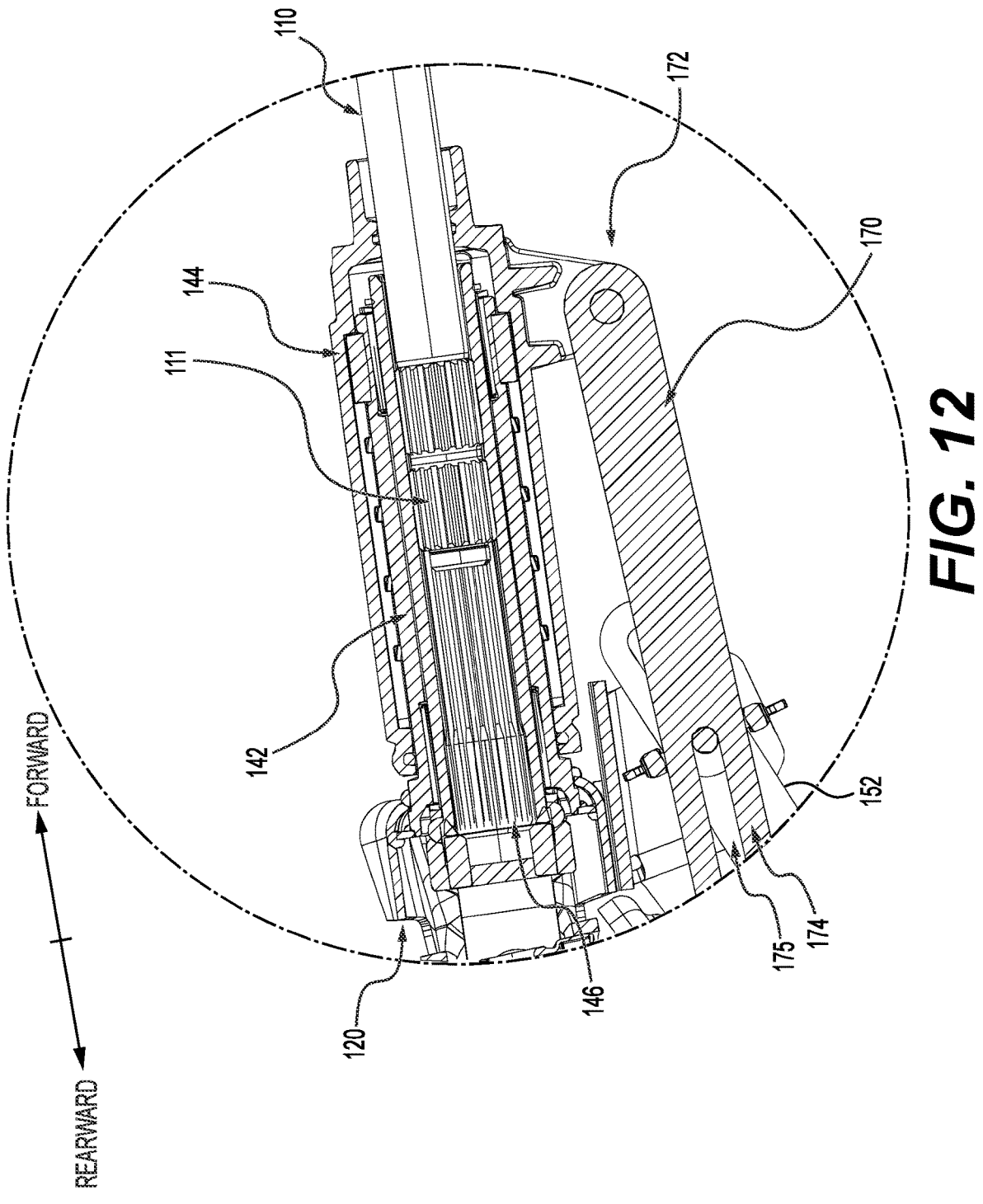
FIG. 12 is a cross-sectional view of the steering column and the steering wheel assembly of FIG. 7, taken along line 12-12 of FIG. 11.

With additional reference to FIGS. 10 to 12, the locking assembly 150 is illustrated in more detail. As is noted above, the locking assembly 150 is configured to selectively lock the steering wheel assembly 128, and thus the steering wheel 28, in any one of a variety of positions including the default position (FIG. 7), the raised position (FIG. 8), the lowered position (FIG. 9), or a plurality of intermediate positions.

The locking assembly 150 includes a plurality of plates 152 connected between the frame 12 and the steering support body 120. While the illustrated embodiment includes six plates 152, different embodiments could include more or fewer plates 152. The plates 152 are generally identical and arranged adjacent and parallel to one another.

A forward end portion 153 of each plate 152 is pivotably connected to the dashboard frame portion 123. A fastener 151 extends through a bracket 125 formed by the frame portion 123 and the plates 152, about which the plates 152 can pivot when the steering wheel assembly is pivoted to different positions.

A rear end portion 154 of each plate 152 is pivotably connected to the steering support body 120. For each plate 152, a slot 155 is defined in the rear end portion 154. A fastener 158 extends through the slots 155 of the plates 152 to secure the rear end portions 154 to the steering support body 120. Specifically, the steering support body 120 forms a bracket 118 for receiving the fastener 158. As the pivot point of the plates 152, specifically the fastener 158 and the bracket 118, is not co-axial with the pivot axis 139 of the steering support body 120 relative to the frame 12, the fastener 158 is received through the slots 155. The slots 155 permit movement of the plates 152 relative to the steering wheel assembly 128 when the steering support body 120 is pivoted relative to the frame 12.

The locking assembly 150 also includes a lever 160 connected to the fastener 158. A cam 157 is operatively connected to and angularly fixed relative to the lever 160. The fastener 158 thus connects together the lever 160, the cam 157, and the plates 152. Specifically, the cam 157 is rotatively connected to the rear end portions 154 of the plates 152.

Rotation of the lever 160 and the cam 157 compress the plates 152 between the cam 157 and the bracket 118 (more specifically one side thereof). Friction between the plates 152 compressed together and against the cam 157 and the bracket 118 then prevent movement of the plates 152, and thus locks the steering wheel assembly 128 in place relative to the frame portion 123.

The lever 160 and the cam 157 are selectively pivotable between at least an unlocked position corresponding to the unlocked configuration of the locking assembly 150 (FIG. 7) and a locked position corresponding to the locked configuration of the locking assembly 150 (FIGS. 8 and 9).

In the unlocked position, illustrated in FIG. 7, the plates 152 are permitted to pivot allowing for movement of the steering support body 120 relative to the frame 12 to permit the steering wheel 28 to be moved between one position and another position. In the locked position, illustrated in FIGS. 8 and 9, the cam 157 compresses the plates 152 for impeding movement of the steering support body 120 relative to the frame 12 to selectively lock the steering wheel 28 in one of the variety of positions described above.

In at least some embodiments, it is contemplated that the lever 160 could be positioned intermediate to the unlocked position and the locked position to partially impede movement of the steering wheel assembly 128 relative to the frame portion 123. An intermediate position of the lever 160 could allow some movement of the steering wheel assembly 128 while limiting free motion thereof, for example for fine adjustments to the position of the steering wheel assembly 128.

In the illustrated embodiment, the locking assembly 150 further includes a telescoping plate 170 for selectively adjusting a distance between the steering wheel 28 and the frame 12. A rear end portion 172 of the telescoping plate 170 is pivotably connected to a rear portion of the steering support body 120. A forward end portion 174 of the telescoping plate 170 is operatively connected to the cam 157. Similarly to the plates 152, the telescoping plate 170 has a slot 175 defined therein and through which extends the fastener 158. When the locking assembly 150 is in the unlocked position, the telescoping plate 170 is selectively translatable. When the locking assembly 150 is in the locked position, the cam 157 impedes movement of the telescoping plate 170 by compressing the forward end portion 174 between the plates 152.

When the locking assembly 150 is in the unlocked position and the telescoping plate 170 is selectively translatable, the driver can pull generally rearward on the steering wheel 28 to adjust the distance between the steering wheel 28 and the dashboard 23 (and the dashboard frame portion 123). When the steering wheel 28 is pulled rearward, an inner shaft 142 slides rearward relative to an outer shaft 144 disposed therearound. An interior surface 146 of the inner shaft 142 is grooved to engaged with the rear end portion 111 of the steering column 110, with the grooves extending along at least a majority of the length of the inner shaft 142. The inner shaft 142, positionally fixed relative to the steering wheel 28, can thus engage with the steering column 110 over various positions of the steering wheel 28 relative to the steering column 110.

In at least some embodiments, it is contemplated that the telescoping plate 170 could be omitted and/or that a distance between the steering wheel 28 and the dashboard 23 could be fixed.

Figures 13, 14:
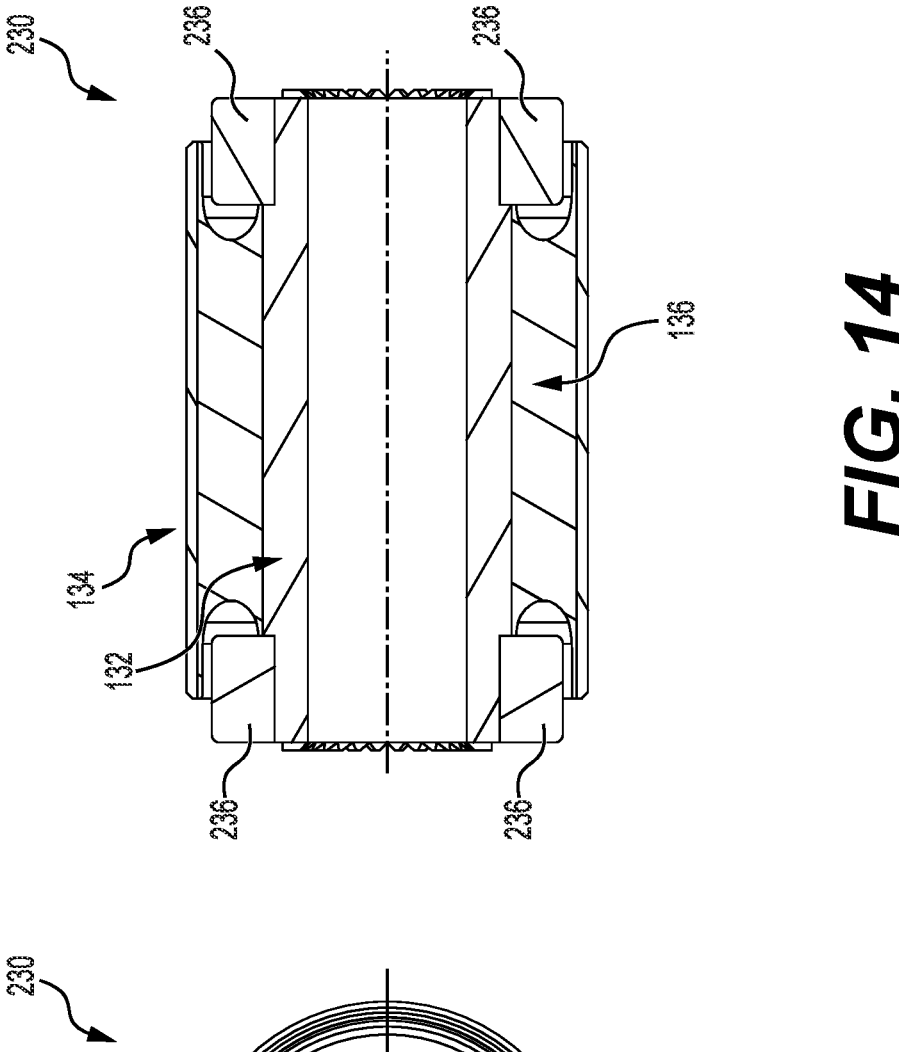
FIG. 13 is a side elevation view of a double bonded bushing for use another non-limiting embodiment of a steering assembly according to the present technology.
FIG. 14 is a cross-sectional view of the double bonded bushing of FIG. 13, taken along line 14-14 of FIG. 13.

With reference to FIGS. 13 and 14, another non-limiting embodiment of a double bonded bushing (DBB) 230 for use in a steering wheel assembly, such as the steering wheel assembly 128, is illustrated. Elements of the double bonded bushing 230 and the corresponding steering assembly that are similar to those of the double bonded bushing 130 and the steering assembly 128 retain the same reference numeral and will generally not be described again.

Specifically, such as steering assembly would include two double bonded bushings 230 to bias the steering wheel assembly toward the default position, as described above. It is contemplated that in some embodiments more double bonded bushings 230 could be included; in some embodiments, only one double bonded bushing 230 may be used.

Each DBB 230 includes two rigid spacers 236 disposed between the inner sheave 132 and the outer sheave 134. The rigid spacers 236 are generally ring shaped and arranged to allow movement of the sheaves 132, 134 therearound. While pivoting motion of the resilient member 136 and the sheaves 132, 133 is unaffected by the rigid spacers 236, the spacers 236 reduce lateral motion (parallel to the axis 139) of the sheaves 132, 134 relative to one another.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
a frame;
a plurality of ground-engaging members operatively connected to the frame;
a motor supported by the frame for driving the vehicle;
a steering assembly for steering the vehicle, the steering assembly comprising:
a steering column operatively connected to at least one ground-engaging member of the plurality of ground-engaging members; and
a steering wheel assembly pivotably connected to the frame, the steering wheel assembly being arranged to pivot about a lateral pivot axis between at least a first position and a second position, the steering wheel assembly comprising:

a steering wheel operatively connected to the steering column, and a steering support body pivotably connected to the frame, the steering wheel being rotationally connected to the steering support body;

at least one double bonded bushing connecting the steering support body to the frame, a first portion of the at least one double bonded bushing being arranged to pivot about the lateral pivot axis relative to a second portion of the at least one double bonded bushing, the at least one double bonded bushing biasing the steering wheel assembly toward the first position; and a locking assembly connected between the steering wheel assembly and the frame, the locking assembly being configured to selectively lock the steering wheel assembly in at least one of the first position and the second position.

2. The vehicle of claim 1, wherein:

the steering wheel assembly is further pivotable to a plurality of intermediate positions between the first position and the second position; and the locking assembly is further configured to selectively lock the steering wheel in any one of the first position, the second position and any one of the plurality of intermediate positions.

3. The vehicle of claim 1, wherein:

the steering wheel assembly is further pivotable to at least a third position;

the first position is intermediate to the second position and the third position; and the locking assembly is further configured to selectively lock the steering wheel in any one of the first position, the second position and the third position.

4. The vehicle of claim 1, wherein:

the frame includes a dashboard frame portion; and the steering support body is pivotably connected to the dashboard frame portion.

5. The vehicle of claim 4, wherein the at least one double bonded bushing comprises:

an inner sheave connected to the dashboard frame portion, the inner sheave being rotationally fixed relative to the dashboard frame portion;

an outer sheave connected to the steering support body, the outer sheave being rotationally fixed relative to the steering support body; and a resilient member connected between the inner sheave and the outer sheave, the outer sheave being pivotable relative to the inner sheave through the resilient member biasing the steering support body, via the outer sheave, toward the first position.

6. The vehicle of claim 5, wherein:

outer ends of the inner sheave abut a frame bracket formed by the dashboard frame portion; and an exterior surface of the outer sheave is press fit into a cylindrical portion formed by the steering support body.

7. The vehicle of claim 4, wherein the dashboard frame portion forms at least part of a dashboard of the vehicle.

8. The vehicle of claim 4, further comprising a universal joint operatively connected to the steering wheel; and wherein the lateral pivot axis passes through the universal joint.

9. The vehicle of claim 8, wherein:

the at least one double bonded bushing includes:

a first double bonded bushing, and a second double bonded bushing; and the lateral pivot axis extends through a center of the first double bonded bushing and a center of the second double bonded bushing.

10. The vehicle of claim 9, wherein:

the first double bonded bushing is disposed on a first side of the steering column; and the second double bonded bushing is disposed on a second side of the steering column.

11. The vehicle of claim 1, wherein:

the at least one double bonded bushing includes:

a first double bonded bushing, and a second double bonded bushing; and the lateral pivot axis extends through a center of the first double bonded bushing and a center of the second double bonded bushing.

12. The vehicle of claim 11, wherein:

the first double bonded bushing is disposed on a first side of the steering column; and the second double bonded bushing is disposed on a second side of the steering column.

13. The vehicle of claim 1, wherein the locking assembly comprises:

a plurality of plates, for each plate of the plurality of plates:

a first end portion being pivotably connected to the frame, and a second end portion being pivotably connected to the steering support body, a cam rotatively connected to the second end portion of the plurality of plates; and a lever connected to the cam; and wherein:

the lever and the cam are selectively rotatable between a locked position and an unlocked position, in the locked position, the cam compresses the plurality of plates for impeding movement of the steering support body relative to the frame to selectively lock the steering wheel in one of the first position and the second position, and in the unlocked position, the plurality of plates are permitted to pivot allowing for movement of the steering support body relative to the frame to permit the steering wheel to be moved between the first position and the second position.

14. The vehicle of claim 13, wherein:

for each plate of the plurality of plates, a slot is defined in the second end portion;

the locking assembly further comprises a fastener extending through the slot; and the fastener connects together the lever, the cam, and the plurality of plates.

15. The vehicle of claim 13, wherein:

the locking assembly further comprises a telescoping plate for selectively adjusting a distance between the steering wheel and the frame;

a first end portion of the telescoping plate is pivotably connected to the steering support body;

a second end portion of the telescoping plate is operatively connected to the cam; and when in the unlocked position, the telescoping plate is selectively translatable; and when in the locked position, the cam impedes movement of the telescoping plate.

16. The vehicle of claim 1, further comprising a driver display connected to the steering support body; and

wherein the driver display pivots and translates with the steering wheel.

17. The vehicle of claim 1, wherein:

the frame includes a dashboard frame portion;

the steering support body is pivotably connected to the dashboard frame portion;

the steering assembly is a power steering system; and the steering assembly includes a steering motor mounted to the dashboard frame portion.

18. The vehicle of claim 1, wherein:

the plurality of ground-engaging members includes front ground-engaging members and rear ground-engaging members; and the at least one ground engaging member connected to the steering assembly is the front ground-engaging members.

19. The vehicle of claim 18, further comprising:

a roll cage connected to the frame, the roll cage and the frame forming a cockpit area; and at least one seat in the cockpit area.

20. The vehicle of claim 19, wherein the vehicle is a side-by-side vehicle (SSV).

\* \* \* \* \*